Figure 1:
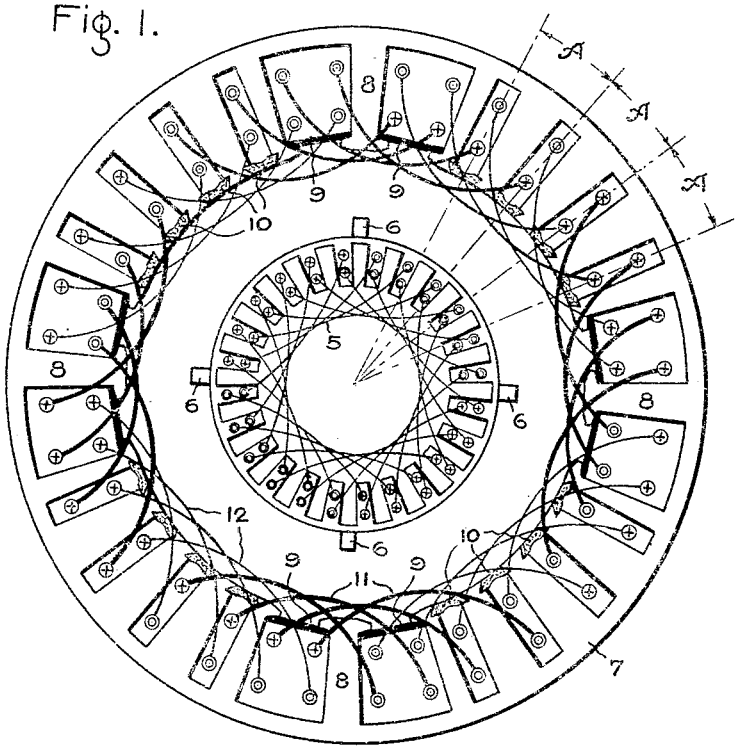

S. R. BERGMAN.
DYNAMO ELECTRIC MACHINE.
APPLICATION FILED NOV. 1, 1916.

1,287,190.

Patented Dec. 10, 1918.

Inventor,
Sven R. Bergman,
by
Att'y.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

1,287,190.   Specification of Letters Patent.   Patented Dec. 10, 1918.

Application filed November 1, 1916. Serial No. 128,893.

*To all whom it may concern:*

Be it known that I, SVEN R. BERGMAN, a subject of the King of Sweden, residing at Nahant, county of Essex, State of Massachusetts, have invented certain new and useful Improvements in Dynamo-Electric Machines, of which the following is a specification.

My invention relates to direct current dynamo-electric machines, and particularly to compensated direct current dynamo-electric machines. The invention more particularly relates to direct current dynamo-electric machines having distributed compensating windings, such, for example, as described in my United States Letters Patent No. 1,173,090, patented Feb. 22, 1916.

The object of my invention is to provide an improved arrangement of the compensating winding in a direct current dynamo-electric machine. More particularly, the object of my invention is to provide a direct current dynamo-electric machine with a single winding for producing substantially an exact compensation of the armature reaction over a large part of the polar arc and the necessary commutating flux in the commutating zone of the polar arc.

The compensation of the armature reaction of a direct current dynamo-electric machine is most satisfactorily effected by a distributed field winding, which may be an exact counterpart of the armature winding. In my aforementioned patent, there is described a distributed compensating winding and a distributed exciting winding each composed of coils of substantially fifty per cent. pitch interleaved to form mechanically a single winding. In order to produce a commutating flux, that is, a flux for assisting in reversing the direction of current flow in the coil undergoing commutation, the compensating winding may be designed to overpower the armature reaction, as described in my aforementioned patent. Again, the compensating winding may be designed to just neutralize the armature reaction, and the necessary commutating flux may be produced by auxiliary commutating coils. In the latter case, the construction is more expensive as well as more complicated on account of the auxiliary coils, while in the first case, the over-compensation is not centralized in the commutating zones, but is distributed over the entire polar arc. In accordance with my present invention, I provide a single distributed winding which just neutralizes the armature reaction over a large part of the polar arc, and in addition produces in the commutating zones a commutating flux of the desired strength. In carrying out my invention, I provide a field magnet member having suitably distributed slots for the accommodation of the distributed compensating winding. Over that portion of the polar arc where exact compensation of the armature reaction is to be obtained, the distribution of the slots is such that the magnetizing effect of the corresponding portion of the compensating winding is substantially equal and opposite to the magnetizing effect of the adjacent portion of the armature winding, while the slot distribution over the rest of the polar arc is such as to provide the desired commutating flux. Preferably, I accomplish this result by making the slot pitch of certain of the middle slots over each polar arc greater than the slot pitch would be if all the slots were uniformly spaced, and this increased slot pitch is determined by the desired strength of the commutating flux.

Figure 2:
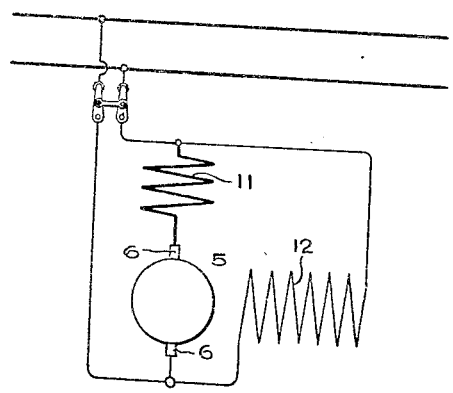

The novel features which I consider patentably characteristic of my invention are definitely indicated in the claims appended hereto. The invention itself together with the construction and mode of operation of a dynamo-electric machine embodying the same will be best understood from the following description taken in conjunction with the accompanying drawing, in which:

Figure 1 is a diagrammatic end view of a direct current dynamo-electric machine embodying the invention; and Fig. 2 is a diagrammatic view of the electrical connections of the windings of the machine of Fig. 1.

The machine illustrated in the drawing is a four-pole machine and has a commutated armature winding 5 of the usual direct current type. Commutator brushes 6 are diagrammatically indicated in the drawing as bearing on the commutator of the armature winding. A field magnet member 7 surrounds the armature winding and has its magnetic material distributed around the armature core to form a substantially uniform air gap. The inner periphery of the field magnet member is provided with a plurality of distributed slots per pole. A definite commutating tooth 8 per pole, is provided by omitting the next adjacent tooth on each side thereof. The resulting wide slot on each side of each commutating tooth is preferably closed with a non-magnetic wedge 9, while the other slots are closed with magnetic wedges 10. A distributed compensating winding 11 composed of coils of substantially fifty per cent. pitch is carried in the slots of the field magnet member. A distributed exciting winding 12, also composed of coils of substantially fifty per cent. pitch, is likewise carried in the slots of the field magnet member. Preferably, the coils of the compensating and exciting windings are interleaved to form mechanically a single winding, as described in my aforementioned patent. The electrical connections and magnetic relations of the windings of the machine are diagrammatically indicated in Fig. 2.

The machine illustrated in the drawing, has in effect 32 slots. If these 32 slots are uniformly distributed, the slot pitch in circular degrees is obviously $\frac{360}{32}$. In the general case, where the field magnet member has N slots, the slot pitch in the case of uniformly distributed slots is $\frac{360}{N}$ degrees. Throughout the specification and claims, I shall designate this quantity $\frac{360}{N}$ as the "uniformly distributed slot pitch". In accordance with my present invention, however, the slots are not uniformly distributed, but instead, certain of the slots have a greater pitch than the other slots. These slots of increased pitch are centrally disposed over the polar arc of each pole face of the field magnet member. In other words, the slots of increased pitch are symmetrically disposed with respect to the exciting axis of the machine, or with respect to the centers of the pole faces on the inner periphery of the field magnet member. Thus, in the machine illustrated in the drawing, the four middle slots over the polar arc have a greater pitch than if the eight slots per pole were uniformly distributed. The polar arc in circular degrees is obviously 360 divided by the number of poles of the machine. Thus, in the four-pole machine illustrated in the drawing, the polar arc is 90 degrees, and extends from one commutating tooth 8 to the adjacent commutating tooth.

The angular distance between the centers of the four middle slots of the polar arc is determined by the desired degree of over-compensation of the compensating winding, and is equal to the uniformly distributed slot pitch multiplied by the desired strength in per cent. of the compensating winding. Thus, if the angular slot pitch in circular degrees is represented by A, and the desired degree of over-compensation of the compensating winding is P per cent., then, $$A = \frac{360}{N} + \frac{360}{N} \times P.$$

For example, take the four-pole machine with 32 slots, as illustrated in the drawing, with a desired over-compensation of ten per cent. The uniformly distributed slot pitch is $$\frac{360}{32} = 11.25 \text{ degrees.}$$

Then in accordance with my present invention, the pitch of the four center slots will be $$11.25 + 11.25 \times .10 = 12.375 \text{ degrees.}$$

The distribution of the slots in accordance with my present invention produces substantially exact (100 per cent.) compensation of the armature reaction over the greater part of the polar arc, while the over-compensation is located only at the commutating zones. Since the angular distance between certain slots in the pole face of the field magnet member is increased over the angle corresponding to an equal spacing of the slots by an amount equal to the desired degree of over-compensation, the ampere turns of compensation will be substantially 100 per cent. over the pole face covered by the slots of increased pitch. The increased strength of the compensating winding with respect to the armature winding is, accordingly, centralized in the commutating zones, thus producing a concentrated commutating flux at the points where it is most useful.

While I have described the preferred embodiment of my invention, I do not limit myself to the same, but aim in the appended claims to cover all embodiments within the spirit and scope of the invention.

What I claim as new and desire to secure by Letters Patent of the United States, is:

1. A direct current dynamo-electric machine having a commutated armature winding, a field magnet member having a plurality of distributed slots per pole, and a distributed compensating winding carried in said distributed slots and designed to over-compensate the reaction of said armature winding, the slot pitch of a plurality of centrally disposed slots over each polar arc being greater than the uniformly distributed slot pitch by the percentage of over-compensation.

2. A direct current dynamo-electric machine having an armature winding, a field magnet member surrounding said armature winding and having N slots on its inner periphery, and a distributed compensating winding carried in said slots and designed to over-compensate the reaction of said armature winding by P per cent., the slot pitch of a plurality of the middle slots over each polar arc being $$\frac{360}{N} + \frac{360}{N} \times P \text{ circular degrees.}$$

3. A direct current dynamo-electric machine having an armature winding, a field magnet member surrounding said armature winding and having a plurality of slots on its inner periphery, and a distributed compensating winding composed of coils of substantially fifty per cent. pitch carried in said slots and designed to neutralize the reaction of said armature winding and to produce a commutating flux, the slot pitch of a plurality of centrally disposed slots over each polar arc being greater than the uniformly distributed slot pitch by the degree of over-compensation required of said compensating winding to produce said commutating flux.

4. A direct current dynamo-electric machine having an armature winding, a field magnet member surrounding said armature winding and having N slots on its inner periphery, and a distributed compensating winding composed of coils of substantially fifty per cent. pitch carried in said slots and designed to over-compensate the reaction of said armature winding by P per cent., the slot pitch of a certain number of slots symmetrically disposed with respect to the centers of the pole faces of said member being $$\frac{360}{N} + \frac{360}{N} \times P \text{ circular degrees.}$$

5. A direct current dynamo-electric machine having an armature winding, a field magnet member surrounding said armature winding and having N slots on its inner periphery, a distributed compensating winding composed of coils of substantially fifty per cent. pitch carried in said slots and designed to over-compensate the reaction of said armature winding by P per cent., the slot pitch of a plurality of centrally disposed slots over each polar arc being $$\frac{360}{N} + \frac{360}{N} \times P \text{ circular degrees,}$$

and a distributed exciting winding composed of coils of substantially fifty per cent. pitch carried in said slots and interleaved with the coils of said compensating winding to form mechanically a single winding.

In witness whereof, I have hereunto set my hand this thirtieth day of October, 1916.

SVEN R. BERGMAN.